F. NOTZ.
MIXING MACHINE.
APPLICATION FILED SEPT. 8, 1908.

959,584.

Patented May 31, 1910.

Witnesses:
Frank Bunn
Katharine Gerlach

Inventor:
Felix Notz
by
Price & Fisher
Attys.

UNITED STATES PATENT OFFICE.

FELIX NOTZ, OF CHICAGO, ILLINOIS.

MIXING-MACHINE.

959,584. Specification of Letters Patent. Patented May 31, 1910.

Application filed September 8, 1908. Serial No. 451,948.

*To all whom it may concern:*

Be it known that I, FELIX NOTZ, a citizen of the United States, and a resident of Chicago, in the county of Cook and State of Illinois, have invented certain new and useful Improvements in Mixing-Machines, of which I do declare the following to be a full, clear, and exact description, reference being had to the accompanying drawing, forming part of this specification.

The present invention has relation more particularly to that class of mixing machines designed for mixing or beating whites of eggs for the manufacture of cake, although it is susceptible of use for mixing a variety of other materials such as are employed in the manufacture of bakery products.

The invention consists in the features of novelty hereinafter described, illustrated in the accompanying drawing and particularly pointed out in the claims at the end of this specification.

Figure 1:
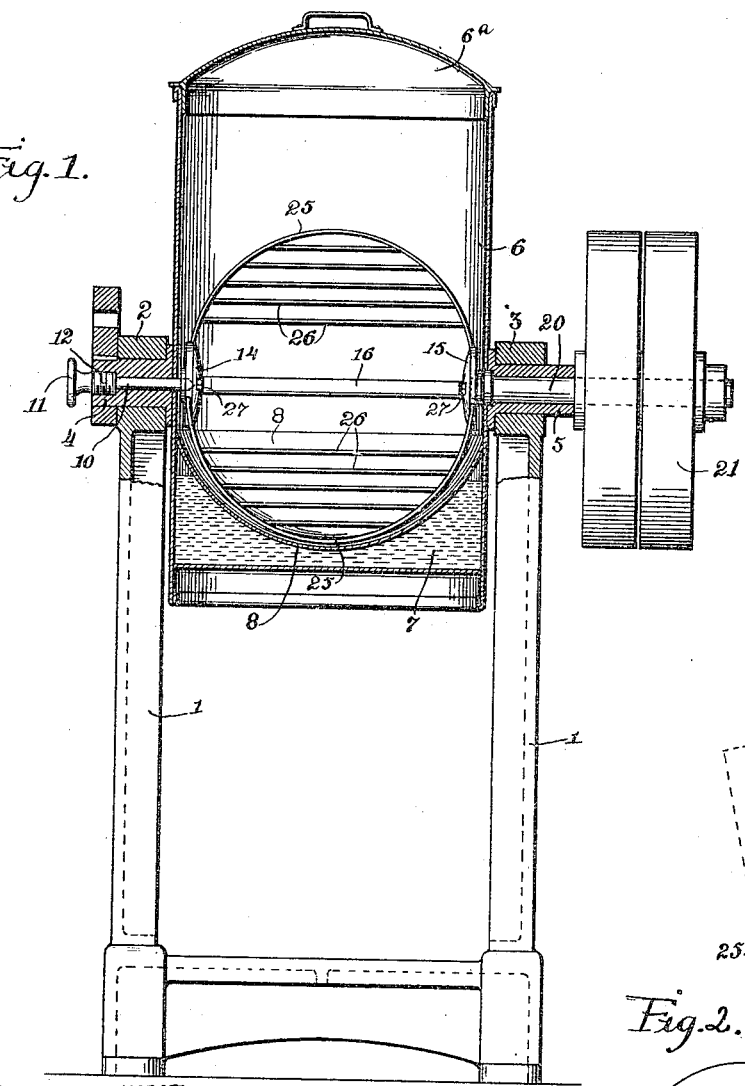
Figure 3:
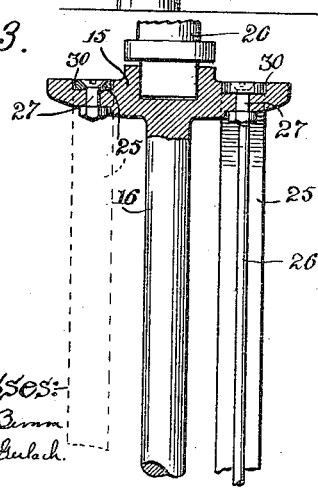
Figure 2:
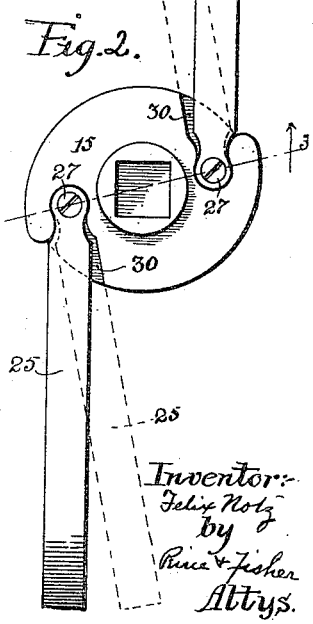

Figure 1 is a view in central vertical section of a machine embodying my invention. Fig. 2 is a detail view of one of the hubs with beater frames attached. Fig. 3 is a view in section on line 3—3 of Fig. 2.

The main frame 1 of the machine is of usual construction, being provided at its top with journal bearings 2 and 3 in which are mounted respectively the sleeves or bushings 4 and 5. Between the inner ends of the bushings 4 and 5 is mounted the casing 6 in which the material to be beaten or mixed will be placed. Preferably, the lower portion of the casing 6 is formed with a chamber 7 adapted to receive water for the purpose of maintaining the contents of the casing 6 at the desired temperature. The inner, bottom wall 8 of the casing 6 is preferably of hemispherical shape. The bushings 4 and 5 are securely joined to the side walls of the casing 6 and through the bushing 5 is formed an opening through which will pass a center pin 10, this center pin having a knob 11 at its outer end whereby the pin may be turned, and having a threaded portion 12 that will engage a correspondingly threaded portion of the bushing 4, so that the pin 10 may be moved in and out, as desired. The inner end of the pin 10 is formed with a conical point adapted to enter a corresponding recess formed in the hub 14 that forms one of the supports for the rotatable beater frames. A similar hub 15 is arranged at the opposite end of the center shaft 16 and the opposite ends of the beater frames are connected to this hub 15. As shown, the hub 15 is formed with a squared or polygonal socket adapted to receive the squared end of the drive shaft 20 that passes through the bushing 5 and serves to impart rotation to the beater frames within the casing 6. Upon the outer end of the shaft 20 is mounted the driving pulley 21.

Any desired number of beater frames may be employed, but, as shown, there are two of such beater frames each comprising a semi-circular blade 25 to which are fixed the beater wires 26. Preferably, each of the beater frames is pivotally connected to the hubs 14 and 15, so as to allow these frames a slight swinging movement, as indicated by dotted lines in Fig. 2, and the pivotal points of the several beater frames are eccentric with respect to the shaft 16.

By reference more particularly to Fig. 2 of the drawing, the preferred manner of pivotally mounting the beater frames will be readily understood. Each end of each of the blades 25 is formed with a hole through which passes a pivot pin 27, the end of this pin being fixed in the corresponding hub 15 (or 14), and the outer face of this hub is formed with a seat 30, the walls of which allow a slight swinging movement to the beater frames, as will be readily seen. The casing 6 will be provided with a suitable cover 6ª.

From the foregoing description it will be seen that when it is desired to place the beater frames within the casing 6, the socket of the hub 15 will be set over the inner squared end of the drive shaft 20 and the center pin will then be screwed inward until its conical point is within the corresponding socket of the hub 14. Rotation will then be imparted to the beater frames from the drive shaft 20. I have found in practice that by pivotally connecting the beater frames to their supports, a far more effective beating of the material can be accomplished. This I attribute to the fact that as the beater frames are revolved the weight of the frames as they successively pass over the center of rotation causes them to drop forward and downward until the edges of the frames contact with the shoulders of the seats 30, and in this position they travel toward the bottom of the machine; but as the blades thus approach the bottom of the machine, the resistance of the material causes the blades to contact with the rear shoulders of the seats 30 and in such position they travel toward the top until they cross the center of revolution. This shifting of the blades tends to agitate the material and prevent the formation of channels, thus causing a more effective exposure of the entire mass to the beating operation. In other words, the pivoting of the blades gives a degree of variableness of action similar to that incident to the beating of egg white or like material by hand and insures a much more effective beating than can be accomplished with blades, such as heretofore employed, that are mounted to travel in concentric paths.

The casing 6 which is journaled in the main frame 1 by the bushings 4 and 5 may be readily tilted to receive the material or to discharge the beaten material therefrom.

I have found the best results from the use of two beater frames, both eccentrically pivoted upon their supports, but, obviously, the number of pivotal beater frames may be varied as desired, and the manner of pivotally mounting the beater frames may also be varied by the skilled mechanic without departing from the spirit of the invention.

Having thus described my invention, what I claim as new, and desire to secure by Letters Patent, is:—

1. A machine of the character described, comprising a casing for containing the material to be mixed or beaten, a plurality of rotatable beater frames carrying blades, means for supporting said frames and wherein one at least of said frames is eccentrically and pivotally mounted, and mechanism for imparting rotation to said beater frames.

2. A machine of the character described, comprising a casing for containing the material to be mixed or beaten, a plurality of rotatable beater frames carrying blades, means for supporting said frames, having seats or sockets wherein one at least of said frames is pivotally mounted, and mechanism for imparting rotation to said beater frames.

FELIX NOTZ.

Witnesses:
HARRY L. CLAPP,
KATHARINE GERLACH.